Nov. 6, 1928.                                          1,690,951
                    E. F. SCHEDWIN
          APPARATUS FOR CUTTING CHEESE OR THE LIKE
                Filed April 26, 1927        2 Sheets-Sheet 1
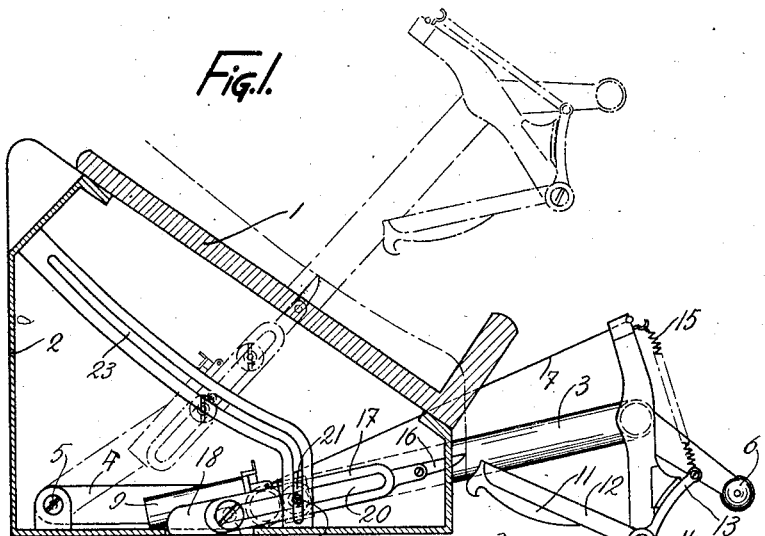
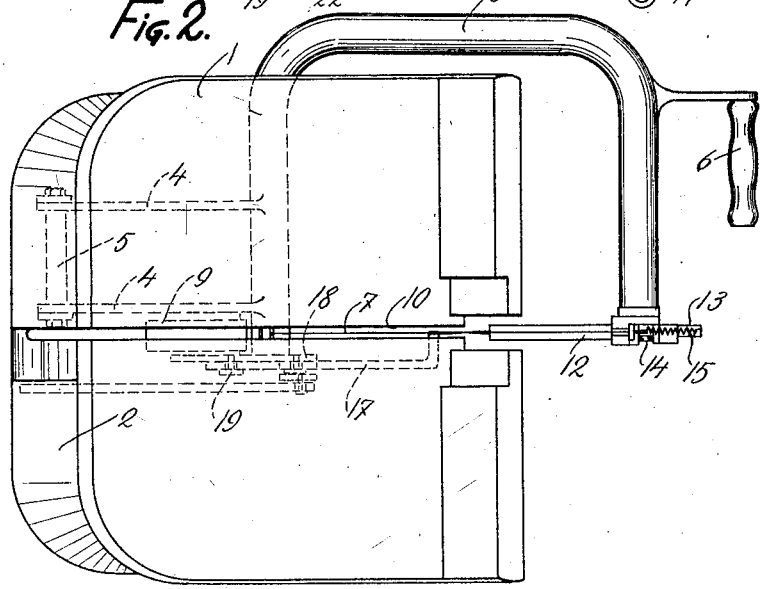
INVENTOR
EMIL FREDRIK SCHEDWIN
BY
ATTORNEY Nov. 6, 1928.    1,690,951
E. F. SCHEDWIN
APPARATUS FOR CUTTING CHEESE OR THE LIKE
Filed April 26, 1927    2 Sheets-Sheet 2
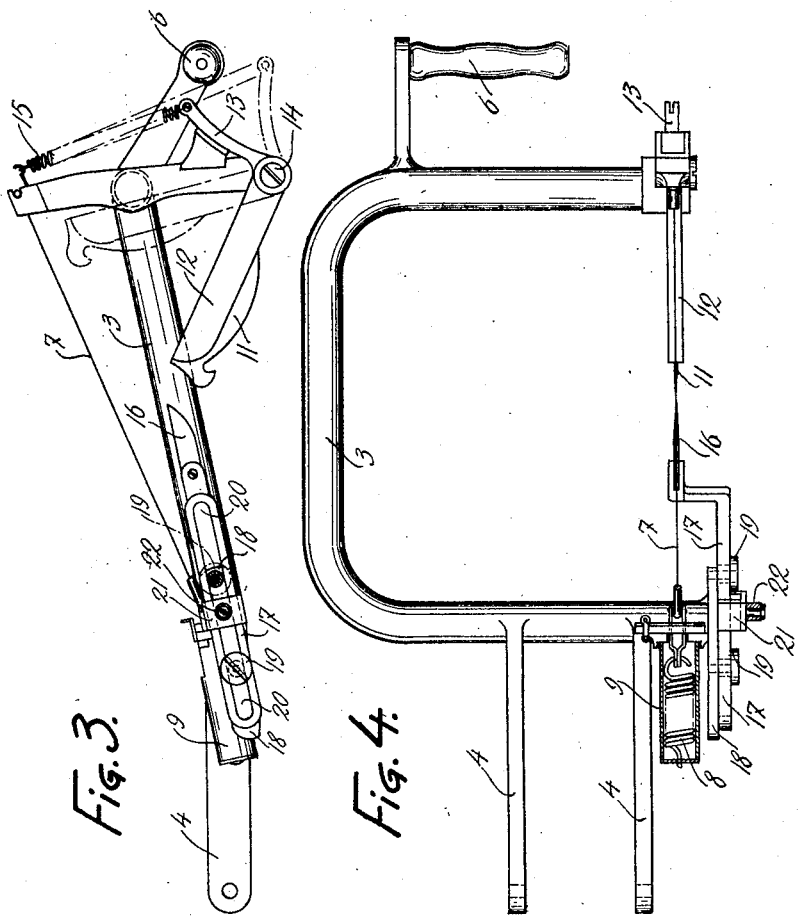
INVENTOR
EMIL FREDRIK SCHEDWIN
BY
ATTORNEY Patented Nov. 6, 1928.

1,690,951

UNITED STATES PATENT OFFICE.

EMIL FREDRIK SCHEDWIN, OF KIRUNA, SWEDEN.

APPARATUS FOR CUTTING CHEESE OR THE LIKE.

Application filed April 26, 1927, Serial No 186,779, and in Sweden February 11, 1927.

This invention refers to certain improvements in apparatus for cutting cheese, butter or the like.

The drawings show a form of embodiment of the cutting apparatus in its improved state. Fig. 1 is a vertical section of the apparatus, and Fig. 2 is a plan view of the same. Fig. 3 is a side-view and Fig. 4 is a plan view on a greater scale of a swingable member supporting the cutting members.

In the drawing 1 is a bevel supporting plate for the cheese, fixed on the upper side of a casing 2, and 3 is an arched or U-shaped member firmly connected with two parallel arms 4, swingably mounted on a pin 5 secured to the casing, so that the arched member 3 may be swung upwards and downwards on the pin 5 by a handle 6. A cutting wire 7 is fastened in said arched member 3, one end of said cutting wire being connected with a spring 8 placed in a tube 9 on the arched member. 10 is a slit in the supporting-plate 1, Fig. 2, for the cutting wire.

A cutting member 11 the edge of which coincides with the wire 7, is mounted on a movable member which is connected with the swingable member 3, and which is in the shape of a two-armed lever 12, 13 pivotal at 14 one arm of said lever carrying the cutting member (which is here shaped almost as a knife), while the other arm is acted upon by a spring 15 tending to keep the lever in the position shown by full-drawn lines in Figs. 1 and 3. Instead of the spring 15 the lever may be weight-loaded, if wanted. By the lever system the cutting member 11 becomes movable in relation to the arched member 3 in the cutting plane of the wire 7, and it is kept in contact with the upper side of the cheese placed on the supporting plate 1, by the action of the spring 15 and cuts the upper side of the cheese through when the arched member 3 is swung downwards.

Further, according to the invention the swingable member 3 is connected with another cutting member, the edge of which coincides with the wire 7 and with the edge of the cutting member 11, such cutting member being intended for cutting through the underside of the cheese at the downward movement of the swingable member 3. In the embodiment shown in the drawing the said cutting member consists of a knife 16 fixed to a slider 17 which is movably mounted on a plate 18. To the said plate which is firmly connected with the swingable arched member 3 two screws 19 are fixed which enter into a longitudinal slot 20 of the slider, to which the necessary guiding during its movements is imparted by the said slot 20 and the screws 19. A cramp 21 is fixed to the slider 17 and provided with a roller 22 which is movable in a curved slot 23, Fig. 1, or another guide of a stationary frame member.

When the arched member 3 is being swung downwards, the slider 17 is displaced by the roller 22 co-operating with the curved slot 23 so that an approximately rectilinear movement is imparted to the knife, as indicated by dot and dash lines in Fig. 1. Thus, the knife moves approximately parallelly with the supporting plate 1, i. e. it follows the under-side of the cheese which is thereby cut through by the knife.

On account of the two cutting members 11 and 16 the wire is freed from the great strains else occuring in cutting through the cheese-rind.

Evidently, the cutting members 11 and 16 may consist of cutting wheels or the like instead of knives.

Having now described my invention, what I claim as new and desire to secure by Letters Patent is:

1. In a cutting apparatus for cheese and the like, a member mounted to swing up and down, a cutting wire carried by the member, a cutter movably mounted on the member below the wire with its edges coinciding with the said wire, and means for operating the cutter on the downward movement of the member to cut through the underside of the cheese, whereby the cutting wire is relieved of strain.

2. In a cutting apparatus for cheese and the like, a member mounted to swing up and down, a cutting wire carried by the member, a cutter movably mounted on the member below the wire with its edge coinciding with the said wire, and means for imparting approximately rectilinear movement to the cutter on the downward movement of the said member, said means comprising a guide, and means on the cutter engaging the said guide.

3. In a cutting apparatus for cheese and the like, a support for the article to be cut, a swinging member, a cutting wire carried by the member, a carrier movably mounted on the swinging member below the wire, a knife on the carrier, a curved slot, a member on the knife carrier and engaging the slot, whereby when the swinging member is moved downwardly the knife will be moved approximately parallel with the support.

4. In a cutting apparatus for cheese and the like, a swinging member, a cutting wire carried by the member, a cutter, and means for mounting the cutter on the swinging member below the cutting wire, whereby when the swinging member is moved downwardly, the cutter will cut through the upper side of the cheese.

5. In an apparatus for cutting cheese and the like, a swinging member, a cutting wire carried by the member, a pivoted member carried by the swinging member below the cutting wire, a knife on the pivoted member, and means for keeping the knife in contact with the upper side of the cheese as the said member is swung downwardly.

6. In an apparatus for cutting cheese and the like, a swinging member, a cutting wire carried by the member, a pivoted two-armed lever carried by the swinging member below the cutting wire, a knife on one arm of said lever, and a spring connected with the other arm of the lever for keeping the knife in contact with the upper side of the cheese when said swinging member is swung downwardly.

7. An apparatus for cutting cheese and the like, comprising a swinging member, a cutting wire carried by said member, a spring pressed knife carried by the swinging member below the wire for cutting the upper side of the cheese as the swinging member is moved downwardly, and a second knife movably mounted on the swinging member below the wire, and means for operating the second knife to cut through the underside of the cheese when the said swinging member is moved downwardly.

In witness whereof, I have hereunto signed my name.

EMIL FREDRIK SCHEDWIN.